May 31, 1927.
G. W. DUCHEMIN
1,630,333
LATHE
Filed May 26, 1925      4 Sheets-Sheet 4
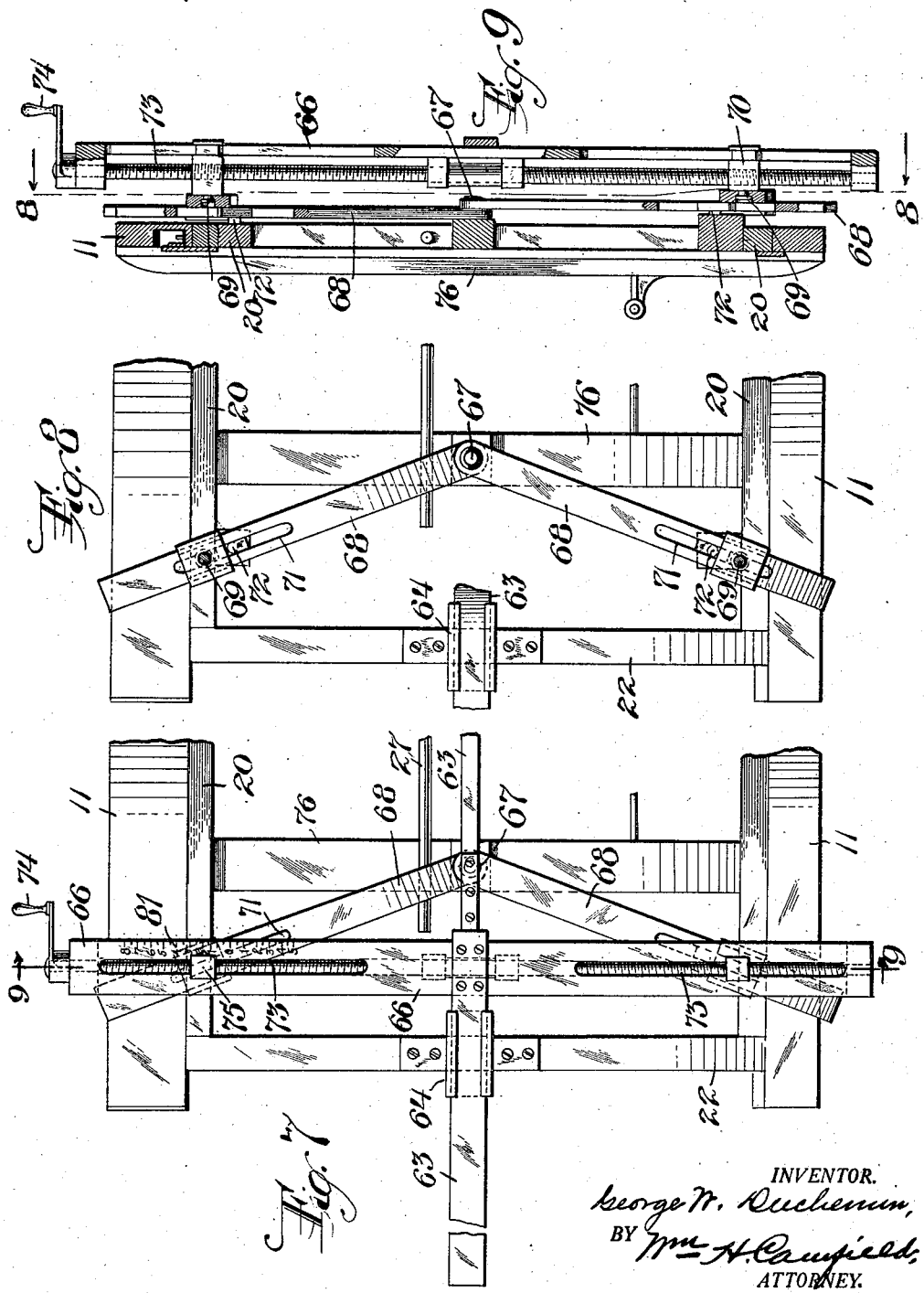
INVENTOR.
George W. Duchemin,
BY Wm. H. Caufield,
ATTORNEY.

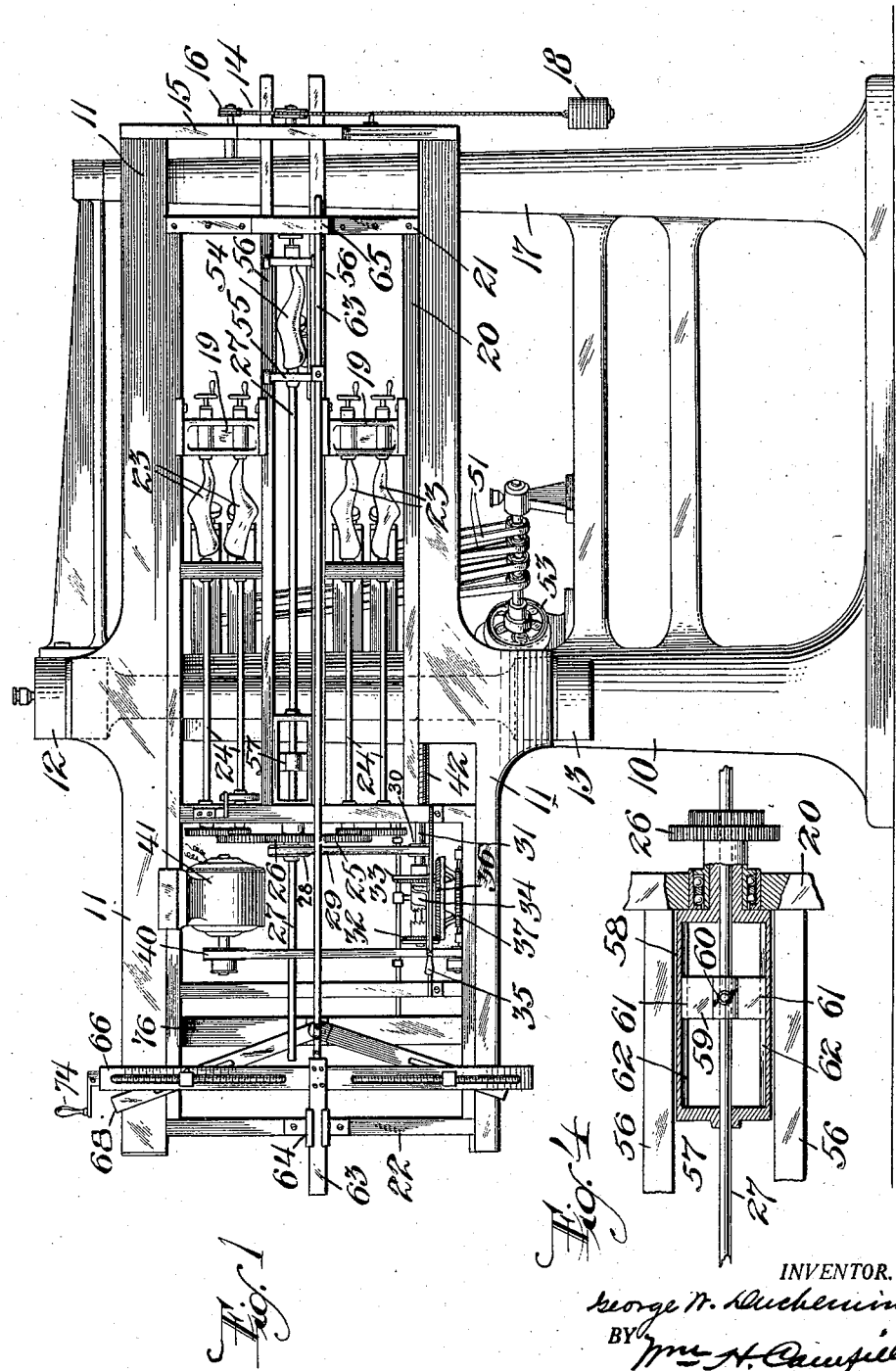

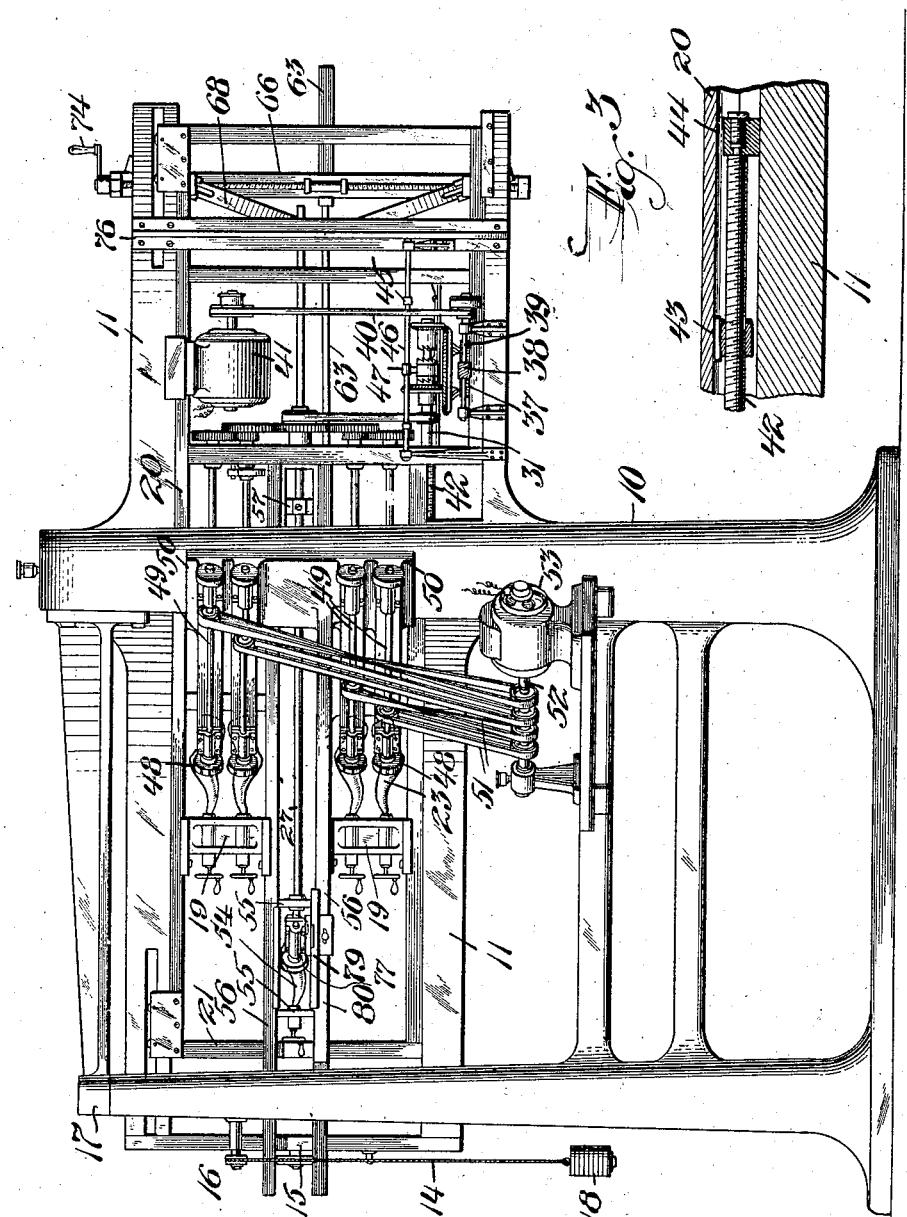

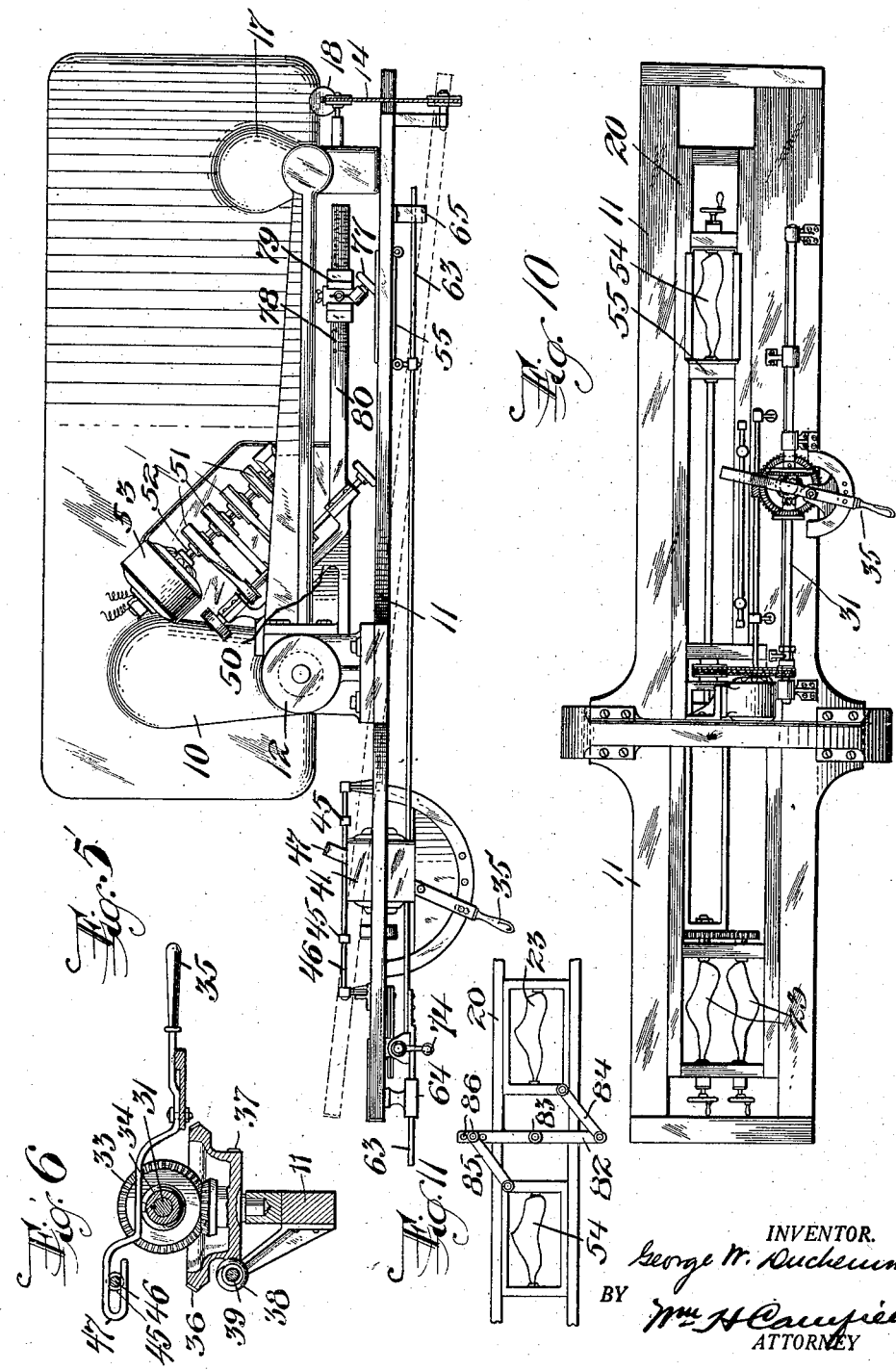

Patented May 31, 1927.

1,630,333

UNITED STATES PATENT OFFICE.

GEORGE W. DUCHEMIN, OF NEWARK, NEW JERSEY.

LATHE.

Application filed May 26, 1925. Serial No. 32,896.

This invention relates to an improved lathe for turning articles and while it is adapted for many uses, it is particularly designed for turning irregular forms such as lasts. The invention is designed to permit the use of a single pattern which is reproduced as an article of the same size or of a size larger or smaller than the pattern, the adjustments for the various sizes being easily and quickly made so that but little time is taken from the operating time of the machine in making such adjustments.

The invention further consists in a structure which is balanced so as to make its operation easy and which has sufficient rigidity to turn out accurate work, and in certain details of construction which will be more fully described hereinafter and finally embodied in the clauses of the claims.

The invention is illustrated in the accompanying drawings in which Figure 1 is a front view of a lathe embodying my invention. Figure 2 is a back view thereof. Figure 3 is a detail of the means for sliding the chuck support of the mechanism. Figure 4 is a detail sectional view of a sliding connection between the shaft and the driving means, which shaft is used for turning the pattern chuck. Figure 5 is a top view of the machine. Figure 6 is a detail section of part of the reversing mechanism. Figure 7 is an enlarged detail front view of a gauge or adjustment means for varying the movement of the pattern chuck relative to its supporting element. Figure 8 is a view of the same structure taken on line 8—8 in Figure 9. Figure 9 is a section taken on line 9—9 in Figure 7. Figures 10 and 11 are front views of constructions to show equivalent means for the modifications of the lathe.

The machine comprises a support usually cast and provided with a vertical column 10 which supports the frame 11, which frame is mounted so that it swings preferably intermediate of its ends and I show the bearings 12 and 13 on the column 10 which bearings project and hold the frame 11 so that it can swing freely, the frame having a yielding means for holding the work up against the pattern wheel and cutting tools, the yielding means shown comprising a cord 14 fastened at one end to the end bar 15 of the frame or gate 11, and passing over the pulley 16 secured to the standard 17 of the support and having the weight 18.

The frame or gate 11 is provided with work holding chucks and in the machine shown in Figures 1, 2 and 5, I show four of such chucks at 19, these being mounted, in pairs in the chuck support 20 which chuck support has the end bars 21 and 22 which define its limits so as to make its proportion clear, this whole chuck support being arranged to slide in the frame or gate 11. The chucks 19 are fixed except that they can be adjusted to take in different lengths of work, the work being illustrated at 23 in the form of lasts, which are revolved against cutters, which revolving means and cutters will be described hereinafter.

The particular form of chuck is not described in detail because it is well known in the trade and there are various forms.

The chucks are operated from the shafts 24 which are rotated by the gearing 25 connecting all of them so that they rotate at the same speed. In the form shown this train of gearing is operated from the central gear 26 on the shaft 27 which shaft carries the pulley 28 which is driven by a belt 29 from the pulley 30 mounted on the shaft 31. The shaft 31 is driven from the gears 32 and 33 alternately through the sliding clutch 34 operated by the handle 35 which connects these gears 32 and 33 and the gear 36.

The gear 36 is on a shaft provided with a worm gear 37 operated from the worm 38 on the shaft 39 which is driven by the belt 40 from the motor 41 mounted on the gate 11. The reason for the reversal of movement is to reverse the sliding movement of the chuck support 20 since the shaft 31 has a screw-threaded portion 42 which is in screw-threaded engagement with a nut 43 fixed on the chuck support 20 and which is in rotative engagement with a collar or abutment 44 on the gate 11 the nut 43 serving as a support for the shaft 31.

The gear 32 is a small one and the gear 33 is a large one so that the return movement of the chuck support after the work has been completed is rapid compared to the forward movement which is necessarily slow. The reversal can be accomplished by manual operation of the handle 35 or it can be done by the adjustable collars 45 on the rod 46 mounted on the back of the gate 11, the rear extension 47 of the handle 35 being in the path of these collars. The manual operation, however, is usual because the workman is usually attending the machine to send the chuck support back to its starting position when the work is completed. It will thus be evident that after the machine is started the chuck support is reciprocated to carry the work 23 past the cutters 48, usually one for each last, these cutters being mounted on shafts 49 supported on the bearing plate 50 secured to the upright 10 and driven by belts 51 from the shaft 52 of the motor 53.

The shape of the work is determined by the pattern 54 which is in a pattern chuck 55, this pattern chuck being mounted between the bars 56 and being slidable thereon so that it can slide relative to the chuck support, either in the same direction at a greater speed or in the same direction at a slower speed, according to whether or not the work is to be smaller or larger than the pattern. This pattern 54 can be of any desired material but is usually made of metal and is kept in the machine until all sizes of this pattern have been made and then the pattern can be changed.

The pattern 54 is rotated in its chuck by the shaft 27 which has a sliding rotative connection with the gear 26 and is connected thereto by a connection shown at 57 which is illustrated in detail in Figure 4, the gear 26 having a yoke-shaped frame 58 into which the slide piece fits at its ends, the slide piece 59 being adjustable by the screw 60 on the shaft 27. The fit of the end 61 of the slide piece 59 is tight in the groove 62 of the frame 58 so that there is no lost rotative motion and the reproduction of the work is therefore accurate compared to the pattern.

The pattern chuck 55 is moved back and forth by a bar 63 which extends from the pattern chuck to the end of the chuck support 20 and is mounted in a bearing 64 on the end bar 22 and in the bearing 65 on the end bar 21. Its movement is caused by a cross-arm 66 to which it is fastened at the centre in line with the pivotal connection 67 of the toggles 68 which are connected by the pivotal pins 69 on the blocks 70 and the cross-arm 66.

The toggles are slotted as at 71 and receive the pins 72 which are part of the sliding chuck support 20 so that as the chuck support slides back and forth, these toggles 68 are swung together to the right and left of the pivot 67. The movement of the cross-arm 66, however, is not always the same because the pivotal blocks 70 can be moved toward and from the centre 67 by the screw 73 which is operated by a suitable handle 74. It will thus be evident that when a last is to be made longer than the pattern the movement of the pattern must be less than the movement of the work, that is, the movement of the chuck support which carries the work, and the screw 73 is operated until the gauge 75 indicates a relative size of the work and the pattern at a point which will lie between the pivotal pins 72 and the centre 67.

If the work is to be of the same size as the pattern, the pins 69 and 72 are in alignment and if the work is to be shorter than the pattern, the pattern is given excess movement by moving the pivotal points 69 beyond the centres 72. This will give an excess throw to the cross-arm 66 as the pivotal connection 67 of the toggles 68 is on the cross-arm 76 of the gate or frame 11.

The increase or decrease of diameter of the work relative to the model is regulated by the distance of the pattern and work from the pivotal centre of swinging movement of the gate 11. The position of the pattern can be shifted since the chuck 55 can be moved back and forth in adjustment longitudinally when the screw 60 is loosened and it is set in proper place for its pattern wheel 77 to indicate on the scale 78 what the relative diameters of the various adjustments will produce on the work.

The pattern wheel is mounted on a clip or bracket 79 adjustable on the bar 80 which is fastened to the upright 10, usually being made in the same piece with the support or bracket 50. The machines are usually so constructed that the relative increase or decrease in length and the relative increase or decrease in diameter have the same insignia or indicating numbers on the scale 81 on the crossarm 66.

It will be understood that various modifications can be made in the proportion and form of the parts of the structure without departing from the scope of the invention and to show such possible modifications I have illustrated in Figure 10 the gate 11 provided with the sliding pattern chuck 55 on one side of the centre of the pivotal support for the gate, the fixed chuck 19 being shown on the opposite side of the centre, the pattern being movable through a considerable distance along the length of the chuck support 20.

It will be understood that both the work and the pattern can be moved in the chuck support and I show in Figure 11 a means for producing such movement by means of the arm 82 pivoted at its centre 83 and having a link 84 to slide the work 23 and a link 85 to slide the pattern 54, the link being adjustable at its pivot 86 so as to vary the distance of movement of the pattern relative to the distance of movement of the work.

I claim:

1. A lathe for turning irregular forms comprising a support, a gate swinging intermediate its ends on the support, a sliding pattern and work carrying chuck support on the gate, chucks on the chuck support on one side of the pivot, a mechanism for rotating the chucks and for reciprocating the chuck support, said mechanism being mounted on the gate on the other side of the pivot, and a pattern wheel and cutters disposed so as to bear on pattern and work in the chucks.

2. A lathe for turning irregular forms comprising a support, a gate swinging intermediate its ends on the support, a sliding pattern and work carrying chuck support on the gate, chucks on the chuck support on one side of the pivot, a mechanism for rotating the chucks and for reciprocating the chuck support, said mechanism being mounted on the gate on the other side of the pivot, a pattern wheel and cutters disposed so as to bear on pattern and work in the chucks, and an adjustable means for varying the distance of sliding travel of one of the chucks relative to the other chucks.

In testimony that I claim the foregoing, I have hereto set my hand, this 6th day of May, 1925.

GEO. W. DUCHEMIN.